(12) United States Patent
Schlichter et al.

(10) Patent No.: US 9,092,208 B2
(45) Date of Patent: Jul. 28, 2015

(54) DEVICE AND METHOD FOR POWERING ETHERNET MIDSPAN DEVICE AND ENDSPAN DEVICE

(75) Inventors: Timothy James Schlichter, Huntsville, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 628 days.

(21) Appl. No.: 13/355,268

(22) Filed: Jan. 20, 2012

(65) Prior Publication Data

US 2013/0187457 A1 Jul. 25, 2013

(51) Int. Cl.
*G06F 1/26* (2006.01)
*H04L 12/10* (2006.01)
*G05F 3/06* (2006.01)

(52) U.S. Cl.
CPC ............... *G06F 1/266* (2013.01); *H04L 12/10* (2013.01)

(58) Field of Classification Search
USPC ......................................... 307/151
See application file for complete search history.

(56) References Cited

U.S. PATENT DOCUMENTS

| | | | |
|---|---|---|---|
| 6,535,983 B1 | 3/2003 | McCormack et al. | |
| 7,117,272 B2 | 10/2006 | Rimboim et al. | |
| 7,313,714 B1 | 12/2007 | Helfinstine et al. | |
| 7,449,796 B2 | 11/2008 | Elkayam et al. | |
| 7,471,014 B2 | 12/2008 | Lum et al. | |
| 7,490,251 B2 | 2/2009 | Lum et al. | |
| 7,509,505 B2 | 3/2009 | Randall et al. | |
| 7,516,340 B2 | 4/2009 | Landry et al. | |
| 7,548,799 B2 | 6/2009 | Landry et al. | |
| 7,603,570 B2 | 10/2009 | Schindler et al. | |
| 7,631,201 B2 | 12/2009 | Hansalia | |
| 7,693,076 B2 * | 4/2010 | Karam .......................... 370/241 |
| 7,774,628 B2 | 8/2010 | Hansalia | |
| 7,793,124 B2 | 9/2010 | Landry et al. | |
| 7,960,860 B2 | 6/2011 | Apfel | |
| 2006/0109728 A1 | 5/2006 | Dwelley et al. | |
| 2007/0278857 A1 | 12/2007 | Robbins | |
| 2007/0284941 A1 | 12/2007 | Robbins | |
| 2007/0288771 A1 | 12/2007 | Robbins | |
| 2009/0041004 A1 | 2/2009 | Emmanuel | |
| 2010/0150556 A1 | 6/2010 | Soto et al. | |
| 2010/0277293 A1 | 11/2010 | Yu et al. | |
| 2011/0254366 A1 | 10/2011 | Borchers | |

OTHER PUBLICATIONS

Schlichter, U.S. Appl. No. 13/355,246, entitled, "Method and System for Furnishing Backup Power and Data from Power Sourcing Equipment to Powered Device," filed Jan. 20, 2012.
Schlichter, U.S. Appl. No. 13/355,175, entitled, "Method and System for Furnishing Power and Data from Power Sourcing Equipment," filed Jan. 20, 2012.
Denicholas, Joseph "Auxiliary Power Extends PoE Applications", ANALOG edge, vol. IV, Issue 4, Apr. 1, 2006.

\* cited by examiner

*Primary Examiner* — Robert Deberadinis
(74) *Attorney, Agent, or Firm* — Maynard Cooper & Gale, P.C.; Jon E. Holland (57) ABSTRACT

A midspan device for providing power and data from a one-pair power sourcing equipment to a two-pair powered device is described. The midspan device is connected to the one-pair power sourcing equipment and takes a portion of the power from the power sourcing equipment to power a converter. The converter converts one-pair data into a two-pair data and forwards the converted data to the two pairs of the powered device. Another portion of the power from the power sourcing equipment is on a DC path and coupled through center tap transformers to provide power to the powered device.

20 Claims, 6 Drawing Sheets

PRIOR ART

FIG. 1

PRIOR ART

DEVICE AND METHOD FOR POWERING ETHERNET MIDSPAN DEVICE AND ENDSPAN DEVICE

RELATED ART

There is currently a growth of local area networks (LANs) and wide area networks (WANs) based on Ethernet technology. Power over Ethernet (PoE) communication systems provide power and data communications over one pair or two pairs of wires, wherein a power source equipment (PSE) provides DC power to a powered device (PD). The IEEE 802.3af-2003 and IEEE 802.3 at-2009 standards describe the requirements for such devices if they are to be interoperable. The standards allow for DC power to be transmitted simultaneously over the same communications medium (the wire pairs) with the high-speed data from one node to the other node. For data-only switches, wherein no DC power is available, a midspan PSE is often connected between the data-only switch and the PD to inject DC power for the PD.

As described above there are several standards that describe Ethernet devices. However, it is often desirable to connect a device compliant with one standard to a device compliant with another standard. For example, it may be desired to connect a powered device (PD) compliant with a two-pair standard to a power sourcing equipment (PSE) that is compliant with a one-pair standard. One technique to avoid making the conversion is to replace the one-pair PSE by a two-pair PSE. Another technique is to replace the two-pair PD with a one-pair PD. Either of these techniques provides an operational Ethernet communication system.

However, when the cost of replacing the two-pair PD is unacceptable to the customer, the customer might insist that the service provider change the PSE to a two-pair PSE. The service provider would then incur the replacement cost and may find such a solution to be unacceptable. Hence, there is a need for a technique that is cost effective and acceptable to both the service provider and the customer.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

For Ethernet communication systems, it may be desirable to connect a one-pair power sourcing equipment (PSE) to a two-pair powered device (PD). However, a direct cable connection is not useful since a one-pair PSE is not compatible with a two-pair PD. A midspan device of the present disclosure forms both a data interface and a power interface for connecting a one-pair PSE to a two-pair PD. The midspan device has a one-pair port for receiving data and power from the one-pair PSE. In addition, the midspan device has a two-pair port for providing both power and data to the two-pair PD. The one-pair port of the midspan device is coupled to the one-pair PSE by a cable, such as a Category 5 cable, having multiple wire pairs; and the two-pair port of the midspan device is coupled to the two-pair PD by another cable.

The midspan device receives power from the one-pair PSE and uses a portion of that power as the energy source for powering the midspan device. Another portion of the power from the one-pair PSE is coupled, via a DC path in the midspan device, to the two-pair PD. Data from the one-pair PSE is coupled to the midspan device over the one pair that provides power to the midspan device. The midspan device has a conventional converter that converts one-pair data from the one-pair PSE to two-pair data for the two-pair PD in accordance with an IEEE standard. The converter is a conventional converter that converts one-pair data to two-pair data in accordance with an IEEE standard. The converter of the midspan device uses a supply voltage of around 3.3 volts DC to operate the circuits of the converter, although other supply voltages may be used in other embodiments. The power voltage from the PSE is generally higher than the supply voltage (i.e., in the range of 44 to 55 volts DC), and the midspan device has a power supply that converts the power voltage of the PSE to a supply voltage for the converter. In one embodiment the power supply is a switched mode power supply (SMPS) that receives the power voltage of the PSE as an input and furnishes a supply voltage for powering the converter.

When the Ethernet units (i.e., the PSE, the midspan device, and the PD) are initially connected, a probe signal is sent out by the PSE. If circuits of the PSE determine, in response to the probe signal, that a valid PD is attached to the PSE, then the power source in the PSE places a power voltage on the one pair of the PSE. When the power voltage is available at the one-pair port of the midspan device, a portion of the power goes to the power supply of the midspan device and another portion of the power is coupled to the two-pair PD over a DC path within the midspan device. When the supply voltage of the power supply is applied to the converter, then one-pair data going into the converter is converted to two-pair data that is coupled to the two-pair PD. Data flow on wire pairs of the Ethernet system is transferred in a differential mode from either of the ports of the midspan device. The power voltage from the PSE is transferred in a differential mode on the one pair and a common mode on the two pairs.

Figure 1:
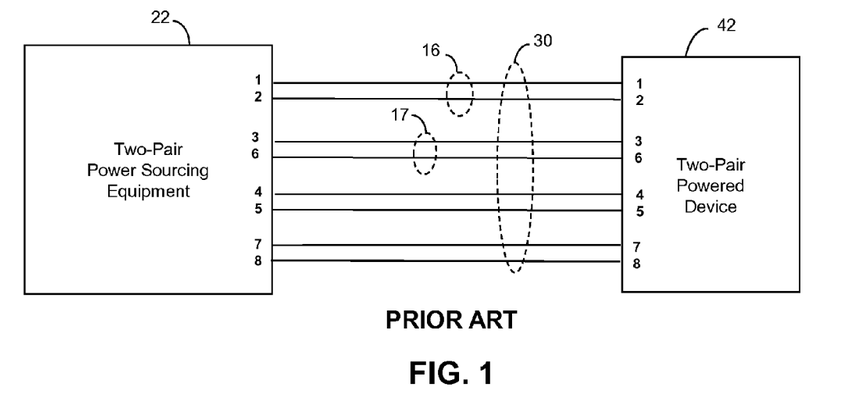
FIG. 1 is a block diagram of a conventional two-pair Ethernet connection between a power sourcing equipment and a powered device.
Figure 2:
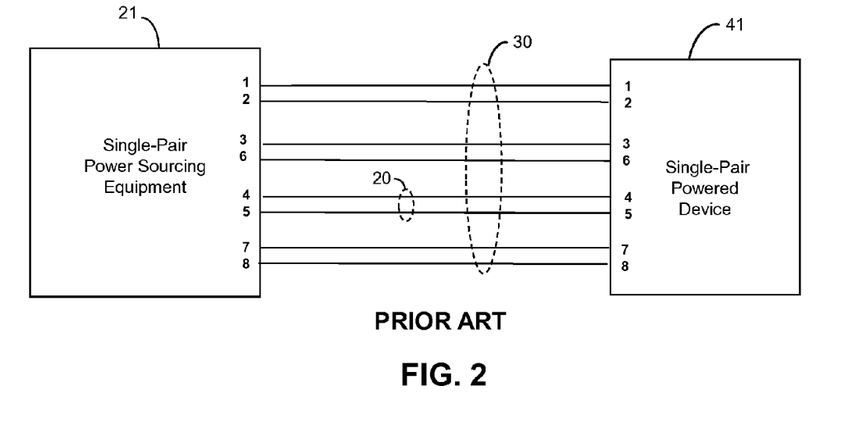
FIG. 2 is a block diagram of a conventional one-pair Ethernet connection between a power sourcing equipment and a powered device.

As used herein, a "one-pair" PSE is a device that provides electrical power via one wire pair to a PD, and a "two-pair" PSE is a device that provides electrical power via two wire pairs to a PD. Similarly, a "one-pair" PD is a device that receives electrical power from a PSE via one wire pair, and a "two-pair" PD is a device that receives electrical power from a PSE via two wire pairs. A conventional Ethernet system is depicted in FIG. 1 where a two-pair PSE 22 is connected to a two-pair PD 42. In the system depicted in FIG. 1, there is a cable 30, such as a Category 5 cable, having four pairs, connecting the PSE 22 and the PD 42. Power and data are coupled on two pairs 16, 17, and the other pairs of the cable are unused or used to transfer data. Data is transmitted over each of the pairs 16, 17 in a differential mode and power is transferred from the two-pair PSE 22 using the pairs 16, 17 in a common mode connection. Another Ethernet system is depicted in FIG. 2 where a one-pair PSE 21 is connected to a one-pair PD 41 over one pair 20 of cable 30. The one-pair 20 transfers both power and data in a differential mode.

Figure 3:
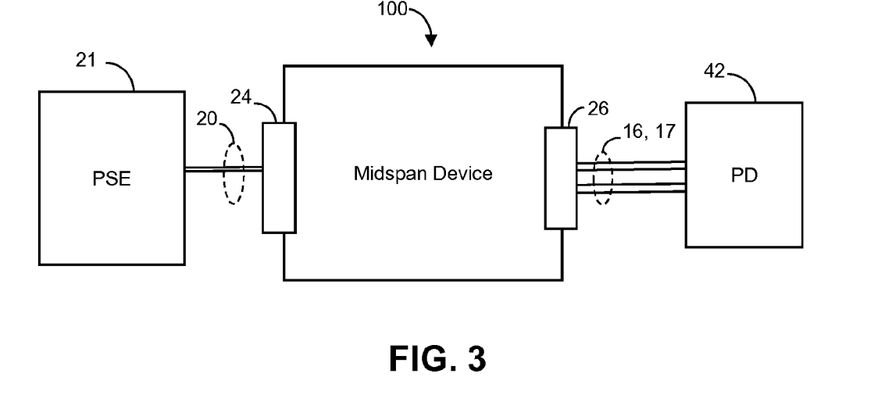
FIG. 3 depicts an embodiment of a midspan device for coupling a one-pair power sourcing equipment to a two-pair powered device in accordance with the present disclosure.

FIG. 3 depicts an embodiment of a midspan device 100 of the present disclosure. A one-pair PSE 21 is coupled via one pair 20 to a one-pair port 24 of the midspan device 100. Note that the one pair 20 may be a wire pair within a multi-pair cable, such as a Category 5 cable 30 (FIG. 2), but the other pairs are not shown for simplicity of illustration. When the one-pair PSE 21 is initially coupled to the midspan device 100 a probe signal, in accordance with an IEEE standard, is sent to the midspan device 100. If the one-pair PSE 21 determines the midspan device 100 is not a valid Ethernet device, then neither data nor power are sent to the mid-span device 100. However, if the midspan device 100 appears as a valid device to the PSE 21, then the PSE 21 transmits power and data to the one-pair port 24 of the midspan device 100. The midspan device 100 does not appear as a valid device to the one-pair PSE 21 unless a two-pair PD 42 is coupled to a two-pair port 26 of the midspan device 100 over wire pairs 16, 17 as shown in FIG. 3. Note that the wire pairs 16, 17 may be within a cable, such as a Category 5 cable 30 (FIG. 2), having more than two wire pairs, but the other pairs are not shown for simplicity of illustration. When power is received, via the one pair 20, the midspan device 100 uses a portion of the received power to provide power to circuits within the midspan device 100 as will be seen. When the midspan device 100 couples a one-pair PSE 21 to a two-pair PD 42 an Ethernet communication system is established, such that data may flow between the PSE 21 and the PD 42 through the midspan device 100. Data flow in the established Ethernet communication system is two way and power flow is one way.

In order to appreciate the benefit of the midspan device 100 consider now a scenario that helps with an understanding of the device's functionality. In the scenario, a cable from a one pair PSE 21 extends from an equipment room to a wall jack, such as an RJ45 jack, that is located in a workplace, such as an office. Within the office is an Ethernet phone that is a two-pair PD 42. If the Ethernet phone is connected to the wall jack, the one-pair PSE 21 will not function with the phone because the one-pair PSE 21 is not compatible with the two-pair PD 42. If the midspan one-pair port 24 of midspan device 100 is connected to the wall jack and the midspan two-pair port 26 is connected to the two-pair PD 42, then the midspan device 100 provides a compatibility link between the one-pair PSE 21 and the two-pair PD 42. Hence, the Ethernet phone, a two-pair PD 42, is now functionally linked to the one-pair PSE 21. The midspan device 100 has circuitry, as will be seen, that allows a one-pair PSE 21 to connect to a two-pair PD 42.

Figure 4:
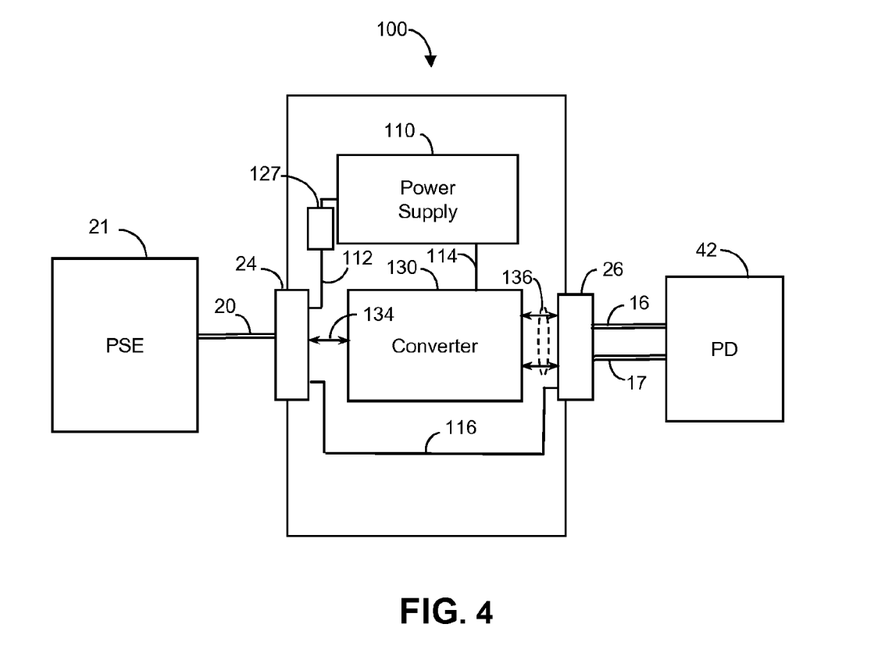
FIG. 4 depicts an embodiment of the midspan device of FIG. 3.

FIG. 4 depicts an embodiment of the midspan device 100 of the present disclosure. A one-pair PSE 21 is coupled to the one-pair port 24 of the midspan device via one pair 20 of a cable 30. On the other side of the midspan device 100, a two-pair PD 42 is coupled to the two-pair port 26 of the midspan device 100 via two pairs 16, 17 of another cable 30. When the three elements, the PSE 21, the midspan device 100, and the PD 42, are initially coupled together the PSE 21 transmits a probe signal across the one pair 20 to determine if a valid PD is available for establishing a communication link. The probe signal is in accordance with applicable IEEE standards, and may have a peak voltage values up to approximately 25 volts according to such standards. When the probe signal is sent out, the amount of current flowing in the one-pair 20 is detected by circuits within the PSE 21. If the current has a range of values, as described in applicable IEEE standards, then logic in the PSE 21 determines that it is connected to a valid PD and in response causes a power voltage to be connected to one pair 20. The power voltage on one pair 20 is received by the one-pair port 24 of the midspan device 100. A portion of the power available in the power voltage is coupled to a power supply 110 over conductors 112. Another portion of the power is coupled from the one-pair port 24 to the two-pair port 26 over a DC path 116 of the midspan device 100. The power supply 110 receives the power voltage, usually around 55 volts DC in one embodiment, at its input terminal and provides a lower output voltage, such as around 3.3 volts DC. The output voltage of the power supply 110, the supply voltage, is coupled to the converter 130 over conductors 114. When the converter 130 is activated upon receiving the supply voltage from the power supply 110, then the converter 130 is ready to send and receive data. On one side of the converter 100, one-pair data flows over one pair 134 in both directions. When the data on one pair 134 is received by the converter 130, the converter 130 separates the data for transmission across two pairs 136. The converter 130 is a full duplex converter, i.e., it is configured to convert single-pair data to two-pair data and to convert two-pair data to single-pair data. A converter configured for full duplex converting, as described above, is generally well known and is not discussed in the disclosure.

In order to prevent the power supply 110 from becoming active when a probe voltage is transmitted, the power supply input is isolated from the probe voltage by one or more voltage block-out circuits 127 coupled between the one-port 24 and the power supply 110. In one embodiment, the block-out circuit is an under voltage lock out (UVLO) circuit that only allows a voltage to be coupled to the power supply 110 if the voltage is greater than a voltage threshold value. In another embodiment, a timing circuit prevents any voltage, including the probe voltage, from being coupled to the input of the power supply unless a time voltage criterion is satisfied. For example, if a voltage does not exceed a certain threshold, such as 25 volts for at least 0.75 seconds or some other predefined length of time, then the voltage is not coupled to the input terminals of the power supply 110. In another embodiment, the combination of the UVLO circuit and the time-voltage circuit prevent power supply activation. In other embodiments, other block-out circuits are possible.

Figure 5:
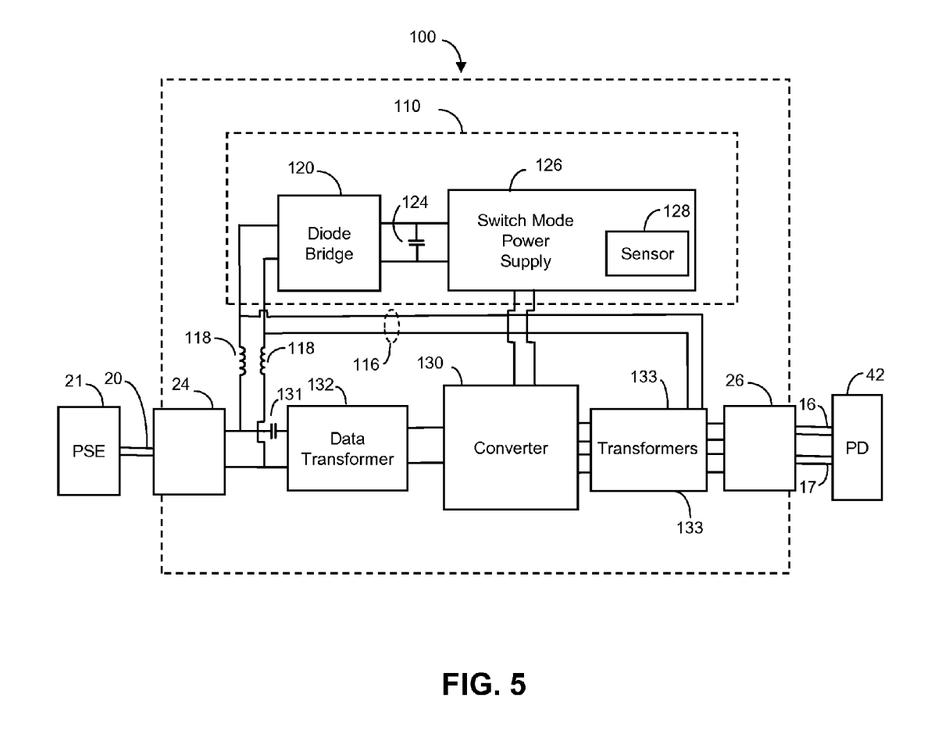
FIG. 5 depicts an embodiment of the midspan device of FIG. 3.

Another embodiment of the midspan device 100 is depicted in FIG. 5. When the one-pair PSE 21, the midspan device 100, and the two-pair PD 42 are initially connected the PSE 21 transmits a probe signal across the one pair 20. The probe signal, as defined in applicable IEEE standards, is considered a DC voltage to the midspan device 100. When the voltage of the probe signal is applied to the midspan device 100, the voltage is prohibited from reaching the input terminals of converter 130 by a blocking capacitor 131 and data transformer 132. However, the probe voltage is DC coupled through inductors 118 to a DC path 116 comprising two conductors. The probe voltage also has a path to the diode bridge 120, but is prevented from activating the switched mode power supply 126 by block-out circuits as previously described. The probe voltage is coupled through center-tap transformers 133 and then to the PD 42 over wire pairs 16, 17 in a common mode arrangement. If the two-pair PD 42 is in compliance with applicable IEEE standards, then it appears as a resistance (e.g., around 25KΩ) to the probe signal. If the resulting current flow in the one-pair PSE 21 is within a certain range, as defined by applicable IEEE standards, then the one-pair PSE 21 places a power supply voltage on one wire pair 20. However, if the current flow detected by the PSE 21 is not in compliance with IEEE standards for detection, then the one-pair PSE 21 will not place the power voltage on one wire pair 20.

When the power voltage from the one-pair PSE 21 is placed on one pair 20 and coupled to the midspan device 100, the midspan device 100 forwards the power voltage to the two-pair PD 42 over DC path 116. When the two-pair PD 42 receives the power voltage, it is turned on and becomes an activated Ethernet device. In addition to providing power to the two-pair PD 42, the power voltage is placed across the diode bridge 120 where it is coupled with a desired polarity to switched mode power supply (SMPS) 126. A filter capacitor 124 is placed across the output of the diode bridge 120 to remove high-frequency voltages from the DC conductors. The SMPS 126 takes the power voltage and provides a supply voltage to the converter 130. The supply voltage activates the converter 130 enabling it to provide for data flow within the midspan device. One-pair data to and from the one-pair PSE 21 is coupled to the converter 130 by data transformer 132. Power is available to the converter 130 from the SMPS 126 and to the two-pair PD 42 over DC path 116 whenever a power voltage is placed on the one-pair 20. Because of the amount of energy in the probe signal transmitted by the one-pair PSE is insufficient to power midspan device circuits, the probe signal is not considered a power voltage.

If the two-pair PD 42 is disconnected from the midspan device 100, then an open circuit is placed across the DC path 116 at the two-pair port 26. The current that then flows in the DC path 116 is essentially zero amps. A current sensor 128 in the SMPS 126 detects there is no current flowing in the DC path 116 and then causes SMPS 126 to shut down such that it no longer provides power to the converter 130. In such case the converter 130 no longer receives a supply voltage and data transfer is stopped. Once the SMPS 126 is shut down, current flowing from the one-pair PSE 21 to the midspan device 100 is essentially zero. The one-pair PSE 21 interprets the essentially zero current as a no load condition and removes the power voltage from the one-pair 20. The PSE 21 then periodically transmits a probe signal to determine if a two-pair PD 42 has been reattached to the two-pair port 26 of midspan device 100.

Figure 6:
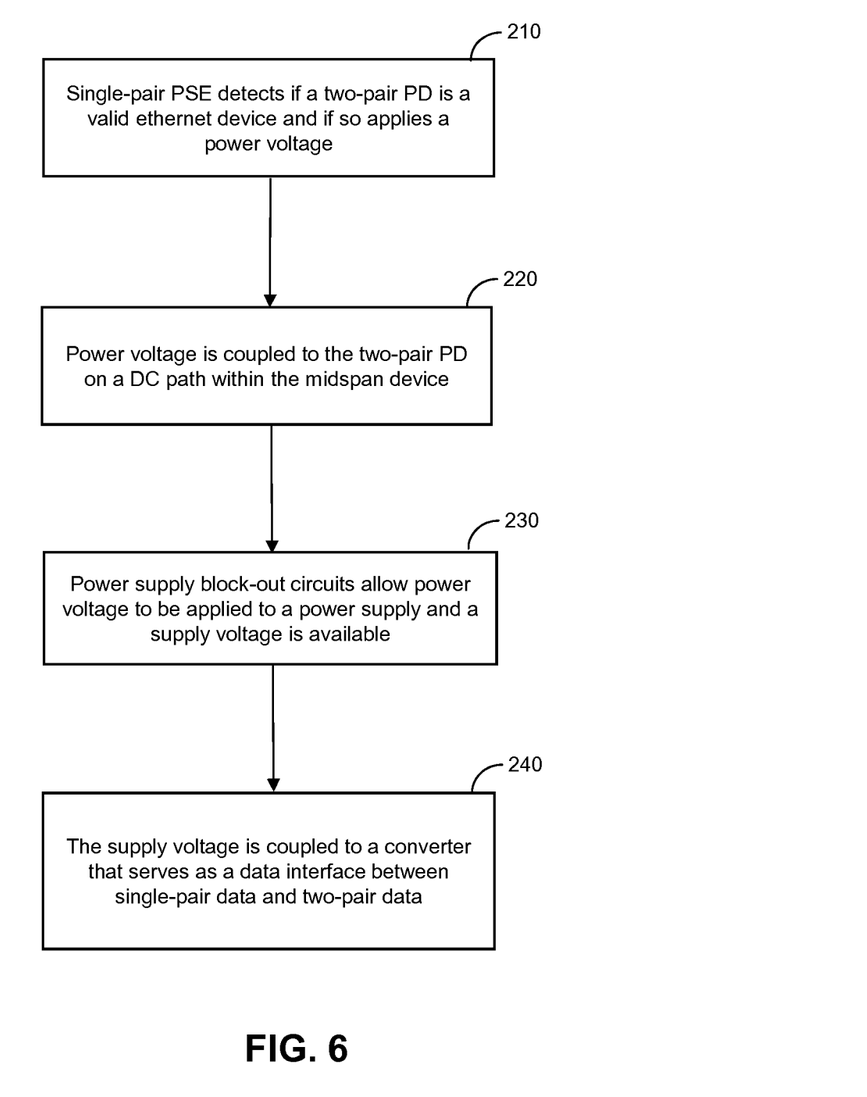
FIG. 6 is a flow chart depicting an exemplary method for coupling data and power on a midspan device, such as is depicted by FIG. 3.

An exemplary method for coupling a one-pair PSE 21 to a two-pair PD 41 is depicted in FIG. 6. After the PSE 21 is connected to the one-pair port 24 of the midspan device 100 and the two-pair PD 42 is connected to the two-pair port 26 of the midspan device 100, the one-pair PSE 21 detects a valid Ethernet device, as shown by block 210. When the one-pair PSE 21 detects a valid device, then PSE 21 applies a power voltage to the one pair 20 that couples power voltage to the one-pair port 24. Thus, the power voltage is coupled to the midspan device on pair 20 and on to the two-pair PD 42 via DC path 116 in the midspan device 100, as shown in block 220. Power block-out circuits, used to prevent probe voltage power supply turn-on, now allow the power voltage to be applied to the power supply 110 so that a supply voltage is available for powering the converter 130, as shown in block 230. When the supply voltage is applied to the converter 130, the converter serves as an interface between one-pair data and two-pair data, as shown in block 240. When the steps as depicted in blocks 210, 220, 230, and 240 have occurred, an Ethernet link is established between one-pair PSE 21 and two-pair PD 42 using midspan device 100 of the disclosure.

Figure 7:
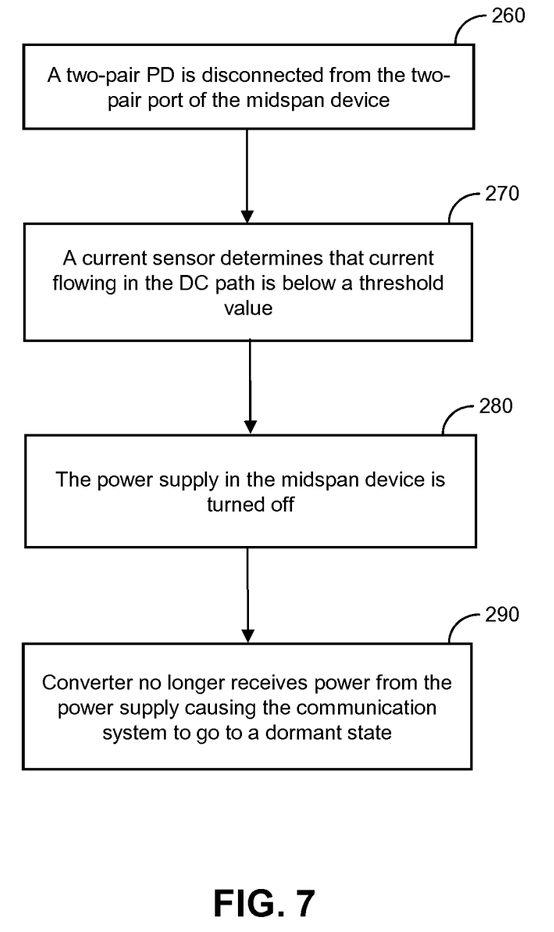
FIG. 7 is a flowchart illustrating an exemplary method for deactivating the midspan device, such as is depicted by FIG. 3.

An exemplary method for resetting the midspan device 100 is depicted in FIG. 7. When a two-pair PD 42 is disconnected, as shown in block 260, there is no need for the power source in the one-pair PSE 21 to furnish power to the midspan device 100. A current sensor 126 of the midspan device 100 determines when current flow in the DC path 116 of the midspan device 100 is below a current threshold value, as shown in block 270. If the current is less than the current threshold value, then the power supply 110 of the midspan device 100 is turned off and no longer draws any current from the power supply of the one-pair PSE 21, as shown in block 280. After the power supply 110 is turned off, then the converter 130 no longer receives power and the data communication system is dormant, as shown in block 290. Power is again applied to the midspan device 100 when a two-pair PD 42 is reattached to the midspan device 100 and the steps of FIG. 6 are repeated.

Figure 8:
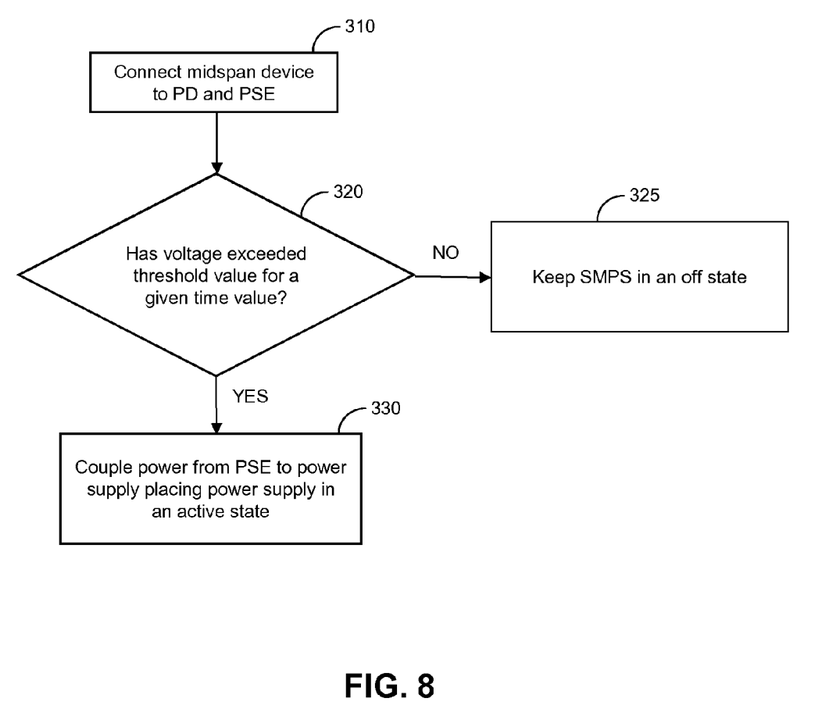
FIG. 8 is a flow chart depicting an exemplary method for activating a midspan device, such as is depicted by FIG. 3.

An exemplary method for blocking a probe signal from input conductors to the power supply 110, such as a SMPS, is depicted in FIG. 8. After the one-pair PSE 21, midspan device 100 and the two-pair PD 42 are connected, the PSE 21 transmits a probe signal across the one pair 20. The probe-signal's sole purpose is to determine if a valid one pair Ethernet device is connected to the one-pair PSE 21. It is not desired that the probe voltage of the probe signal become an input, a source of activation, for the power supply 110. Since the time-voltage-characteristic or shape of the probe signal is defined in applicable IEEE standards, a block-out circuit can prohibit the probe signal from being connected to the input of the power supply 110. For example, if the voltage seen by the block-out circuit does not exceed a threshold voltage value, such as 25 volts, for a given time value, such as, for example, 0.75 seconds, then the power supply 110 remains in an off state, block 325. However, if the threshold voltage value is exceeded for the given time value, as shown in block 320, then power from the one-pair PSE 21 is coupled to the power supply 110, such as a SMPS 130, placing the power supply 110 in an active state, as shown in block 330.

It should be emphasized that the above-described embodiments of the present disclosure are merely possible examples of implementations set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Now, therefore, the following is claimed:

1. A midspan device for connecting an Ethernet one-pair power sourcing equipment (PSE) to a two-pair powered device (PD) comprising:
   a path for direct current coupling the PSE to the PD;
   a power supply configured to provide a supply voltage in response to a power voltage from the PSE; and
   a converter powered by the supply voltage and configured to convert one-pair data from the PSE into two-pair data for the PD.

2. The midspan device of claim 1, wherein the power supply is a switched mode power supply.

3. The midspan device of claim 1, further comprising an under voltage lock out circuit configured to prevent input voltages below a threshold voltage from activating the power supply.

4. The midspan device of claim 1, further comprising transformers with center taps configured to couple the power voltage of the PSE to a common mode power voltage on two pairs coupled to the PD.

5. The midspan device of claim 1, further comprising a timing circuit configured to prevent a probe voltage from the PSE from activating the power supply.

6. The midspan device of claim 1, further comprising a current detector configured to monitor current of the one pair and deactivate the power supply when the current is below a threshold value.

7. The midspan device of claim 1, further comprising a diode bridge configured to couple the supply voltage to the power supply.

8. The midspan device of claim 1, wherein data from the PSE is blocked from flowing on the path.

9. A midspan device for providing data communication between an Ethernet one-pair power sourcing equipment (PSE) and a two-pair powered device (PD), the midspan device comprising:
   a converter for converting one-pair data from the PSE to two pair data for the PD, wherein power for powering the converter is provided by the PSE; and
   a DC path between the PSE and the PD.

10. The midspan device of claim 9, wherein a power voltage from the PSE is coupled to a power supply that provides a supply voltage for the converter.

11. The midspan device of claim 10, further comprising a lock out circuit configured to prohibit voltages from the PSE below a threshold voltage from activating the power supply.

12. The midspan device of claim 9, further comprising a time-voltage circuit configured to block a probe voltage from the PSE from activating the power supply.

13. The midspan device of claim 10, wherein the path comprises a plurality of conductors extending between a one-pair port and a two-pair port.

14. The midspan device of claim 13, further comprising a current sensor for measuring a current in one of the plurality of conductors, the current sensor configured to cause a shut down of the power supply when the measured current is less than a threshold value.

15. The midspan device of claim 9, further comprising blocking inductors configured to prohibit data flow on the DC path.

16. A method for providing a data communication link between an Ethernet power sourcing equipment (PSE) and a powered device (PD), the method comprising:
   transforming a power voltage of the PSE to a common mode power voltage for the PD;
   applying to a converter a converter supply voltage from the power voltage of the PSE;
   converting one-pair data of the PSE to two-pair data for the PD; and
   transferring data via the converter between the PSE and the PD.

17. The method of claim 16, further comprising:
   receiving a probe signal from the PSE; and
   preventing the probe signal from generating a supply voltage for the converter.

18. The method of claim 16, further comprising removing the converter supply voltage from the converter if current from the PSE drops below a threshold value.

19. A midspan device comprising:
   a DC path for connecting a differential mode power voltage on a one-pair port to a common mode power voltage on the two-pair port; and
   a converter for converting one-pair data from the PSE to two-pair data for the PD, wherein the converter is configured to receive power from the one-pair port.

20. The device of claim 19, further comprising a current detector configured to measure current in the DC path and cause removal of power to the converter when the measured current is below a threshold value.

* * * * *